US011674254B2

(12) United States Patent
Kim

(10) Patent No.: US 11,674,254 B2
(45) Date of Patent: *Jun. 13, 2023

(54) LAUNDRY TREATING APPARATUS

(71) Applicant: LG ELECTRONICS INC., Seoul (KR)

(72) Inventor: Sunghoon Kim, Seoul (KR)

(73) Assignee: LG Electronics Inc., Seoul (KR)

( * ) Notice: Subject to any disclaimer, the term of this patent is extended or adjusted under 35 U.S.C. 154(b) by 64 days.

This patent is subject to a terminal disclaimer.

(21) Appl. No.: 17/189,514

(22) Filed: Mar. 2, 2021

(65) Prior Publication Data

US 2021/0277570 A1   Sep. 9, 2021

(30) Foreign Application Priority Data

Mar. 6, 2020  (KR) ........................ 10-2020-0028179

(51) Int. Cl.
*D06F 37/06* (2006.01)
*D06F 23/02* (2006.01)
(Continued)

(52) U.S. Cl.
CPC ............ *D06F 37/065* (2013.01); *D06F 23/02* (2013.01); *D06F 37/06* (2013.01); *D06F 58/04* (2013.01); *D06F 37/04* (2013.01); *F16B 5/065* (2013.01)

(58) Field of Classification Search
CPC .......... D06F 23/02; D06F 37/04; D06F 37/06; D06F 37/065; D06F 58/04
See application file for complete search history.

(56) References Cited

U.S. PATENT DOCUMENTS

| 9,062,405 B2 * | 6/2015 | Yoon ........................ D06F 37/02 |
| 2007/0017259 A1 * | 1/2007 | Cho ......................... D06F 37/06 68/3 R |

(Continued)

FOREIGN PATENT DOCUMENTS

| CN | 1414163 | 4/2003 |
| CN | 201495419 | 6/2010 |

(Continued)

OTHER PUBLICATIONS

Extended European Search Report in European Appln. No. 21160702.3, dated Jun. 29, 2021, 9 pages.

(Continued)

*Primary Examiner* — Joseph L. Perrin
(74) *Attorney, Agent, or Firm* — Fish & Richardson P.C.

(57) ABSTRACT

A laundry treating apparatus includes: a drum and a lifter that is disposed at an inner circumferential surface of the drum, that revolves, that includes a frame cover and a lifter frame including (i) a frame base coupled to the inner circumferential surface and including a seating groove provided along a circumference of the frame base, (ii) a frame upper plate spaced apart from the frame base in a direction toward a center of the drum, and (iii) a frame sidewall connecting the frame upper plate to the frame base. The frame cover includes a cover upper plate and a cover sidewall having (i) a lower end mounted on the seating groove to couple to the frame base and (ii) an upper end connected to the cover upper plate. A spacing rib providing a space between the cover sidewall and the frame sidewall protrudes from the seating groove.

12 Claims, 11 Drawing Sheets

(51) Int. Cl.
  *D06F 58/04* (2006.01)
  *F16B 5/06* (2006.01)
  *D06F 37/04* (2006.01)

(56) References Cited

U.S. PATENT DOCUMENTS

| | | | |
|---|---|---|---|
| 2013/0081432 A1 | 4/2013 | Choi et al. | |
| 2014/0366283 A1* | 12/2014 | Jun | D06F 37/04 8/137 |
| 2015/0233040 A1 | 8/2015 | Kim et al. | |
| 2017/0067198 A1* | 3/2017 | Kim | D06F 37/065 |
| 2017/0191202 A1* | 7/2017 | Lee | D06F 37/06 |
| 2019/0100865 A1* | 4/2019 | Bauman | D06F 37/06 |
| 2019/0330778 A1 | 10/2019 | Sinard et al. | |

FOREIGN PATENT DOCUMENTS

| | | |
|---|---|---|
| CN | 109402952 | 3/2019 |
| CN | 110195333 | 9/2019 |
| CN | 110820243 | 2/2020 |
| EP | 2251477 | 11/2010 |
| EP | 3190220 | 7/2017 |
| KR | 20030060553 | 7/2003 |
| KR | 200358903 | 8/2004 |
| KR | 20070002285 | 1/2007 |
| KR | 1020070048913 | 5/2007 |
| KR | 100802467 | 2/2008 |
| KR | 1020170082055 | 7/2017 |
| WO | WO2008140169 | 11/2008 |
| WO | WO 2018196845 | 11/2018 |
| WO | WO2020012026 | 1/2020 |
| WO | WO2020216051 | 10/2020 |

OTHER PUBLICATIONS

Office Action in Australian Appln. No. 2021201443, dated Mar. 25, 2022, 7 pages.
Notice of Allowance in Korean Appln. No. 10-2020-0028179, dated Apr. 15, 2022, 4 pages (with English translation).
Office Action in Chinese Appln. No. 202110230744.2, dated Nov. 25, 2022, 7 pages.

* cited by examiner 61a, 61b, 62a, 62b, 63a, 63b

LAUNDRY TREATING APPARATUS

CROSS-REFERENCE TO RELATED APPLICATION

This present application claims the benefit of priority to Korean Patent Application No. 10-2020-0028179, entitled "Laundry Treating Apparatus," filed on Mar. 6, 2020, in the Korean Intellectual Property Office, the entire disclosure of which is incorporated herein by reference.

FIELD

The present disclosure relates to a laundry treating apparatus and, more particularly, to a laundry treating apparatus comprising a rotating drum in which a lifter is provided.

BACKGROUND

In general, a washing machine is a machine that washes laundry by using an emulsifying effect of detergent, a frictional force of a water stream made by rotation of a washing blade, and an impact applied by the washing blade. Such a washing machine mainly uses an electric motor as a main power source, and as the washing, rinsing, and spin-drying processes are performed using the action of detergent and water, contaminants in clothing are separated from the clothing.

Washing machines are divided into a cylinder type, an agitator type, and a pulsator type depending on the washing method. Among them, the cylinder-type washing machine (hereinafter referred to as "drum-type washing machine") includes a drum rotatably disposed within a tub and performs the washing process by putting water and detergent into the drum in which laundry has been received.

Recently, some of the drum-type washing machines include additional elements such as lifters installed in the drum in order to improve the washing effect. When such a lifter is installed in the drum, as the drum is rotated at a predetermined speed, the laundry in the drum is lifted by the lifter to a certain height and then rolls down along an inner circumferential surface of the drum, which is called a rolling motion. When the rolling motion occurs, a friction is generated between the laundry and the drum in the process in which the laundry rolls down, which induces an effect of gently rubbing the laundry.

In relation to this, Korean Patent Application Publication No. 10-2017-0082055 (hereinafter referred to as "related art 1") discloses a washing machine including a plurality of lifters on an inner circumferential surface of a drum which rotates about an approximately horizontal rotation axis.

In detail, the lifter includes a first member coupled to the inner circumferential surface of the drum and a second member which is mounted to the first member and protrudes to the inside of the drum so as to lift up the laundry in the drum when the drum is rotated.

However, the washing machine of related art 1 has a deficiency in that since an upper plate of the first member and an upper plate of the second member are not formed to correspond to each other, a deformation that is caused by an external force may not be appropriately dealt with.

In addition, when a gap between an outer surface of the first member and an inner surface of the second member becomes relatively narrow due to a deformation of the second member, foreign substances may get stuck in the gap, which may cause hygiene-related issues.

Furthermore, considering that the lifter should be manufactured by assembling the first member and the second member together, there is a possibility that the assembling of the first member and the second member may not be carried out smoothly if an error occurs when each of the first member and the second member is designed and manufactured, which may increase the manufacturing cost and time of the lifter.

Further, Korean Patent Application Publication No. 10-2007-0048913 (hereinafter referred to as "related art 2") discloses a manufacturing method of a drum of a washing machine. According to the manufacturing method of related art 2, a cylindrical drum is manufactured by forming mounting holes for mounting lifters in a metal plate of a quadrangular shape and then rolling the metal plate.

Also, Korean Utility Model Registration No. 20-0358903 (hereinafter referred to as "related art 3") discloses a structure in which a lifter is installed in a drum by using mounting holes. The mounting holes are arranged in a front-rear direction of the drum at regular intervals, and a set of mounting holes arranged in this manner is used to mount one lifter. That is, corresponding to the number of one set of mounting holes, the same number of hooks are formed in the lifter, and the hooks are caught by the mounting holes.

However, when the lifters are installed in the drum in the manner described in related arts 2 and 3, a relatively large number of mounting holes should be formed in the drum, and thus the drum may become vulnerable to buckling, which may cause a deformation.

In addition, as the number of the mounting holes that are used for installing a single lifter increases, the assembling of the lifter becomes more complex and inconvenient, which leads to an increase of the manufacturing cost and time of the lifter.

As described above, existing washing machines have several shortcomings that could occur when an additional component such as the lifter is installed in the drum for improving performance of the washing machine, and the shortcomings should be appropriately resolved.

SUMMARY

The present disclosure is directed to addressing said shortcomings associated with existing washing machines.

Specifically, an aspect of the present disclosure is directed to providing a laundry treating apparatus capable of preventing hygiene-related issues that could occur when foreign substances accumulate between members of a lifter after the members are assembled.

In addition, an aspect of the present disclosure is directed to providing a laundry treating apparatus characterized in that the members of the lifter may be smoothly assembled, and thus manufacturing of the lifter may be facilitated.

Furthermore, an aspect of the present disclosure is directed to providing a laundry treating apparatus characterized in that each of the members of the lifter may be designed and manufactured to correspond to each other in terms of structure, such that a deformation caused by an external force is appropriately dealt with.

Aspects of the present disclosure are not limited to the above-mentioned aspects, and other technical aspects not mentioned above will be clearly understood by those skilled in the art from the following description.

According to one embodiment of the present disclosure, a laundry treating apparatus is characterized in that a uniform distance between a lifter frame and a frame cover of a lifter may be maintained such that foreign substances are prevented from accumulating between the lifter frame and the frame cover. Specifically, a spacing rib may be protrudingly formed in a seating groove of the lifter frame on which the frame cover is mounted, such that an inner surface of the frame cover is spaced apart from an outer surface of the lifter frame by the spacing rib.

According to one embodiment of the present disclosure, the laundry treating apparatus is characterized in that the frame cover may be smoothly mounted to the seating groove when the frame cover and the lifter frame are assembled. In detail, as a protruding surface of the spacing rib is formed to be curved, the frame cover may slide along the protruding surface of the spacing rib while the frame cover is being mounted to the seating groove.

According to one embodiment of the present disclosure, the laundry treating apparatus is characterized in that the spacing rib may be disposed in a curved portion of a frame base.

According to one embodiment of the present disclosure, the laundry treating apparatus is characterized in that while a coupling tab of the frame cover is being inserted into a tab binding port, the coupling tab may slide along an inclined surface of a tab guide portion which is formed on a frame sidewall.

According to one embodiment of the present disclosure, the laundry treating apparatus is characterized in that a stepped portion may be formed on a bottom surface of the frame base at a portion in which the tab binding port is formed, such that the coupling tab that has been inserted into the tab binding port is bent and mounted to the stepped portion.

According to one embodiment of the present disclosure, the laundry treating apparatus is characterized in that a supporting rib may be protrudingly formed on an inner bottom surface of the seating groove such that a lower end portion of the frame cover is supported by the supporting rib while being spaced apart from the inner bottom surface of the seating groove.

According to one embodiment of the present disclosure, the laundry treating apparatus is characterized in that when an external force is applied to the frame cover, the frame cover may be appropriately supported by the lifter frame. In detail, a spacer may be formed to protrude from a frame upper plate towards the inner surface of the frame cover and extend along one direction, so as to support the frame cover when the frame cover is deformed by an external force.

According to one embodiment of the present disclosure, the laundry treating apparatus is characterized in that the spacer may support the frame cover while being spaced apart from an inner surface of a cover upper plate.

According to one embodiment of the present disclosure, the laundry treating apparatus is characterized in that the spacer may support the frame cover while contacting the inner surface of the cover upper plate.

According to one embodiment of the present disclosure, the laundry treating apparatus is characterized in that a dome may be protrudingly formed in the cover upper plate at a position that corresponds to the spacer.

According to one embodiment of the present disclosure, the laundry treating apparatus is characterized in that a lifter may be manufactured by assembling the lifter frame made of a synthetic resin material and the frame cover made of a metallic material.

According to one embodiment of the present disclosure, the laundry treating apparatus is characterized in that a plurality of front lifters and a plurality of rear lifters may be installed, respectively, along a longitudinal direction of the drum.

Technical solutions of the present disclosure are not limited to the above-mentioned technical solutions, and other technical solutions not mentioned above will be clearly understood by those skilled in the art from the following description.

Hereinafter, the effect of the laundry treating apparatus according to the present disclosure will be described.

According to at least one of the embodiments of the present disclosure, the spacing rib may be protrudingly formed in the seating groove of the lifter frame on which the frame cover is mounted, such that the inner surface of the frame cover is spaced apart from the outer surface of the lifter frame by the spacing rib. Accordingly, foreign substances may be prevented from accumulating between the lifter frame and the frame cover.

According to at least one of the embodiments of the present disclosure, the protruding surface of the spacing rib may be formed to be curved, and thus the frame cover may slide along the protruding surface of the spacing rib while being mounted to the seating groove. Accordingly, the frame cover and the lifter frame may be more smoothly assembled to each other.

According to at least one of the embodiments of the present disclosure, since the spacing rib is disposed in a curved portion of the frame base, the spacing rib may space the frame cover and the lifter frame apart from each other in relatively more directions in a plane view of the frame base.

According to at least one of the embodiments of the present disclosure, the coupling tab may slide along the inclined surface of the tab guide portion which is formed on the frame sidewall, while the coupling tab of the frame cover is being inserted into the tab binding port. Accordingly, the frame cover and the lifter frame may be more smoothly assembled.

According to at least one of the embodiments of the present disclosure, the stepped portion may be formed on the bottom surface of the frame base such that the coupling tab is bent and mounted to the stepped portion. Accordingly, an assembled state of the frame cover and the lifter frame may be more stably maintained.

According to at least one of the embodiments of the present disclosure, the supporting rib may be protrudingly formed on the inner bottom surface of the seating groove such that the lower end portion of the frame cover is supported by the supporting rib while being spaced apart from the inner bottom surface of the seating groove. Accordingly, the frame cover may be formed such that the lower end of the frame cover has a length smaller than a length of the seating groove, which may improve a structural stability.

According to at least one of the embodiments of the present disclosure, the spacer may be formed to protrude from the frame upper plate towards the inner surface of the frame cover and extend along one direction, so as to support the frame cover that is deformed when an external force is applied thereto. Accordingly, a uniform distance between the frame cover and the lifter frame may be maintained even when an external force is applied.

According to at least one of the embodiments of the present disclosure, since the spacer supports the frame cover while being spaced apart from the inner surface of the cover upper plate, the frame cover may be supported with a maximum distance maintained between the frame cover and the lifter frame when an external force is applied.

According to at least one of the embodiments of the present disclosure, since the spacer supports the frame cover while contacting the inner surface of the cover upper plate, the frame cover may be supported without vibration being generated between the frame cover and the lifter frame when an external force is applied.

According to at least one of the embodiments of the present disclosure, since the dome is protrudingly formed in the cover upper plate at a position that corresponds to the spacer, a position of the spacer may be stably maintained, and thus a washing performance through an upper surface of the lifter may be further improved.

According to at least one of the embodiments of the present disclosure, since the lifter is manufactured by assembling the lifter frame made of a synthetic resin material and the frame cover made of a metallic material, the lifter may be more stably coupled to the drum, and improvements may be made in terms of hygiene, structure, and beauty.

According to at least one of the embodiments of the present disclosure, since a plurality of front lifters and a plurality of rear lifters are installed along the longitudinal direction of the drum, a blind spot in the drum that the lifter does not reach may be minimized, to thereby improve the washing performance.

Further scope of the applicability of the present disclosure will be apparent from the detailed description below. However, since various changes and modifications within the spirit and scope of the present disclosure can be clearly understood by those skilled in the art, it should be understood that specific embodiments, such as the detailed description and preferable exemplary embodiments of the present disclosure, are just given as examples.

BRIEF DESCRIPTION OF THE DRAWINGS

The foregoing and other aspects, features, and advantages of the invention, as well as the following detailed description of the embodiments, will be better understood when read in conjunction with the accompanying drawings. For the purpose of illustrating the present disclosure, there is shown in the drawings an exemplary embodiment, it being understood, however, that the present disclosure is not intended to be limited to the details shown because various modifications and structural changes may be made therein without departing from the spirit of the present disclosure and within the scope and range of equivalents of the claims. The use of the same reference numerals or symbols in different drawings indicates similar or identical items.

DETAILED DESCRIPTION

Figure 1:
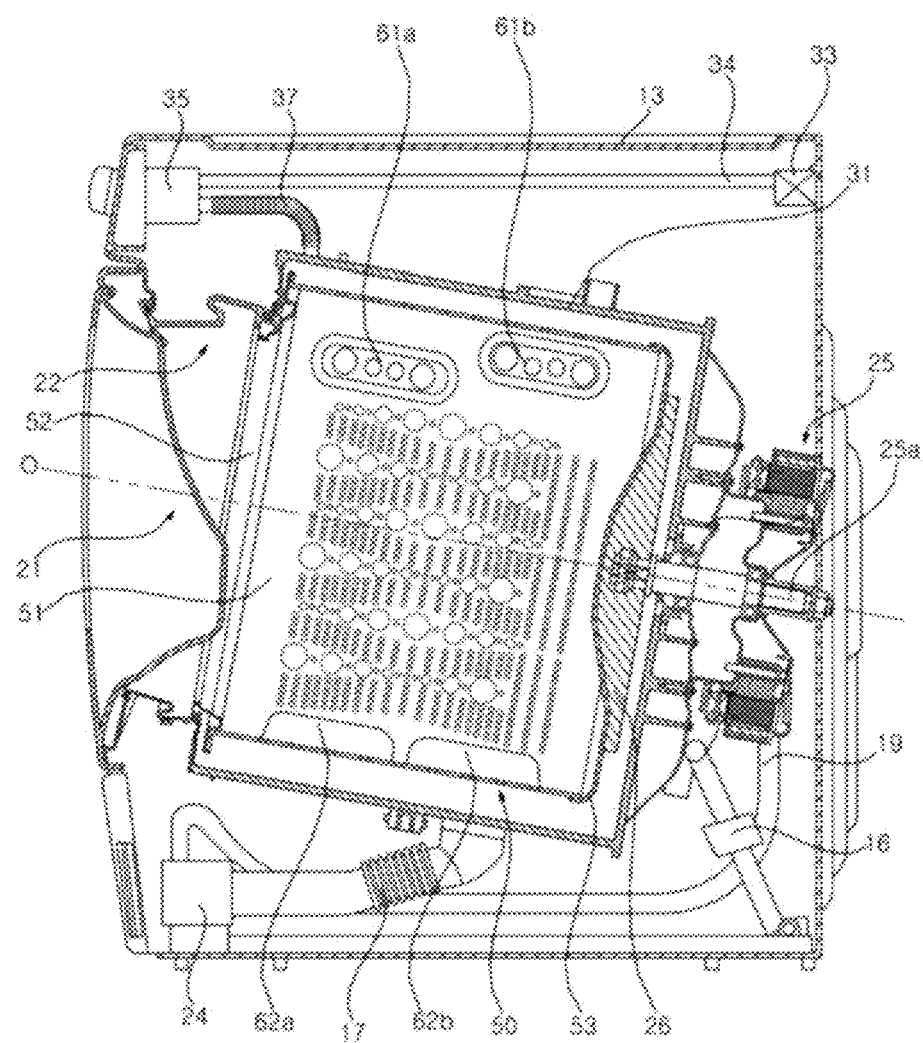
FIG. 1 is a cross-sectional view of a laundry treating apparatus according to one embodiment of the present disclosure.

Advantages and features of the present disclosure and methods for achieving them will become apparent from the descriptions of aspects herein below with reference to the accompanying drawings. However, the present disclosure is not limited to the aspects disclosed herein but may be implemented in various different forms. The aspects are provided to make the description of the present disclosure thorough and to fully convey the scope of the present disclosure to those skilled in the art. It is to be noted that the scope of the present disclosure is defined only by the claims.

The shapes, sizes, ratios, angles, the number of elements given in the drawings are merely exemplary, and thus, the present disclosure is not limited to the illustrated details. Like reference numerals designate like elements throughout the specification.

In relation to describing the present disclosure, when the detailed description of the relevant known technology is determined to unnecessarily obscure the gist of the present disclosure, the detailed description may be omitted.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms "first", "second", "third", etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

The term "or" as used herein is to be interpreted as an inclusive or meaning any one or any combination. Therefore, "A, B or C" means any of the following: "A; B; C; A and B; A and C; B and C; A, B and C". An exception to this definition will occur only when a combination of elements, functions, steps or acts are in some way inherently mutually exclusive.

As used herein, the expressions "at least one," "one or more," and "and/or" are open-ended expressions that are both conjunctive and disjunctive in operation. For example, each of the expressions "at least one of A, B, and C," "at least one of A, B, or C," "one or more of A, B, and C," "one or more of A, B, or C" and "A, B, and/or C" includes the following meanings: A alone; B alone; C alone; both A and B together; both A and C together; both B and C together; and all three of A, B, and C together. Further, these expressions are open-ended, unless expressly designated to the contrary by their combination with the term "consisting of:" For example, the expression "at least one of A, B, and C" may also include an nth member, where n is greater than 3, whereas the expression "at least one selected from the group consisting of A, B, and C" does not.

Hereinafter, preferable exemplary embodiments of the present disclosure will be described in detail referring to the attached drawings. In the following description, known functions or features will be omitted in order to clarify the gist of the present disclosure.

Hereinafter, a washing machine will be described as an example of a laundry treating apparatus, but the laundry treating apparatus is not limited to the washing machine. The laundry treating apparatus, as an apparatus for treating laundry (or an object to be dried) such as clothes inserted into a drum 51, may be a dryer or a washing-drying machine.

Referring to FIG. 1, a laundry treating apparatus according to an embodiment of the present disclosure may include a casing 13 configured to define an exterior of the laundry treating apparatus, a water storage tub 31 disposed in the casing 13 and configured to store washing water, a washing tub 50 which is rotatably installed in the water storage tub 31 and into which laundry is inserted, and a motor 25 configured to rotate the washing tub 50. A damper 16 configured to absorb vibration of the water storage tub 31 may be provided in the casing 13.

A drum 51 may be rotated about a rotation axis O extending in a front-rear direction of the drum 51, and the drum 51 may constitute the washing tub 50. The rotation axis O may be approximately horizontal. Here, the term "horizontal" does not mean "geometrically horizontal" in a strict sense. As illustrated in FIG. 1, even though the rotation axis is inclined at a certain angle about a horizontal line, if the rotational axis is closer to the horizontal line than to a vertical line, it will be said in this specification that the drum 51 or the washing tub 50 is rotated about a horizontal axis.

A laundry input hole may be formed on a front surface of the casing 13, and a door 21 configured to open and close the laundry input hole may be rotatably provided in the casing 13. A gasket 22 having a tubular shape and configured to communicate the laundry input hole and an entrance of the water storage tub 31 may be provided. The gasket 22 may be made of a soft material (for example, rubber). A front end of the gasket 22 may be connected to a circumference of the laundry input hole of the casing 13, and a rear end of the gasket 22 may be connected to a circumference of the entrance of the water storage tub 31.

A water supply valve 33, a water supply pipe 34, and a water supply hose 37 may be installed inside the casing 13. When the water supply valve 33 is opened and the washing water is supplied, the washing water that has passed through the water supply pipe 34 may be mixed with a detergent in a dispenser 35 which stores the detergent, and then the washing water may be supplied to the water storage tub 31 through the water supply hose 37.

An inlet port of a pump 24 may be connected to the water storage tub 31 through a drain hose 17, and an outlet port of the pump 24 may be connected to a drain pipe 19. The water discharged from the water storage tub 31 through the drain hose 17 may be pumped by the pump 24, flow through the drain pipe 19, and then be discharged to the outside of the laundry treating apparatus.

The washing tub 50 may include the drum 51, a front cover 52 coupled to a front end of the drum 51, and a rear cover 53 coupled to a rear end of the drum 51. The drum 51 may be formed in a tubular (or cylindrical) shape, and may be manufactured by rolling a metal plate (for example, a stainless steel plate) including a plurality of through holes 51h (see FIG. 9) formed therein, and then joining two opposite sides of the metal plate. The water stored in the water storage tub 31 may be introduced into the washing tub 50 through the plurality of through holes 51h. A plurality of embossed portions 51a (see FIG. 9), which are formed on an inner circumferential surface of the drum 51 to be convex by a plastic processing, and the plurality of through holes 51h may be formed between the plurality of embossed portions 51a.

An opening portion may be formed in the front cover 52 such that laundry can be inserted into the drum 51. The entrance of the water storage tub 31 may communicate with the opening portion of the front cover 52. The front cover 52 may be made of the same material as that of the drum 51.

The rear cover 53 may close an open rear side of the drum 51, and a spider 26 connected to a driving shaft 25a of the motor 25 may be coupled to a rear surface of the rear cover 53. The spider 26 may transmit rotational force of the driving shaft 25a to the washing tub 50, and the driving shaft 25a of the motor 25 may be coupled to a center of the spider 26.

A plurality of lifters 61a, 61b, 62a, 62b, 63a, and 63b may be provided in the drum 51. When the drum 51 is rotated, the laundry in the drum 51 may be lifted up by the lifters 61a, 61b, 62a, 62b, 63a, and 63b.

The plurality of lifters 61a, 61b, 62a, 62b, 63a, and 63b may include first lifters and second lifters disposed along the front-rear direction of the drum 51. Hereinafter, an example in which the first lifters are front lifters 61a, 62a, and 63a and the second lifters are rear lifters 61b, 62b, and 63b, which are spaced rearward from the front lifters 61a, 62a, and 63a, will be described. However, depending on the embodiment, the first lifters may be the rear lifters, and the second lifters may be the front lifters.

Figure 9:
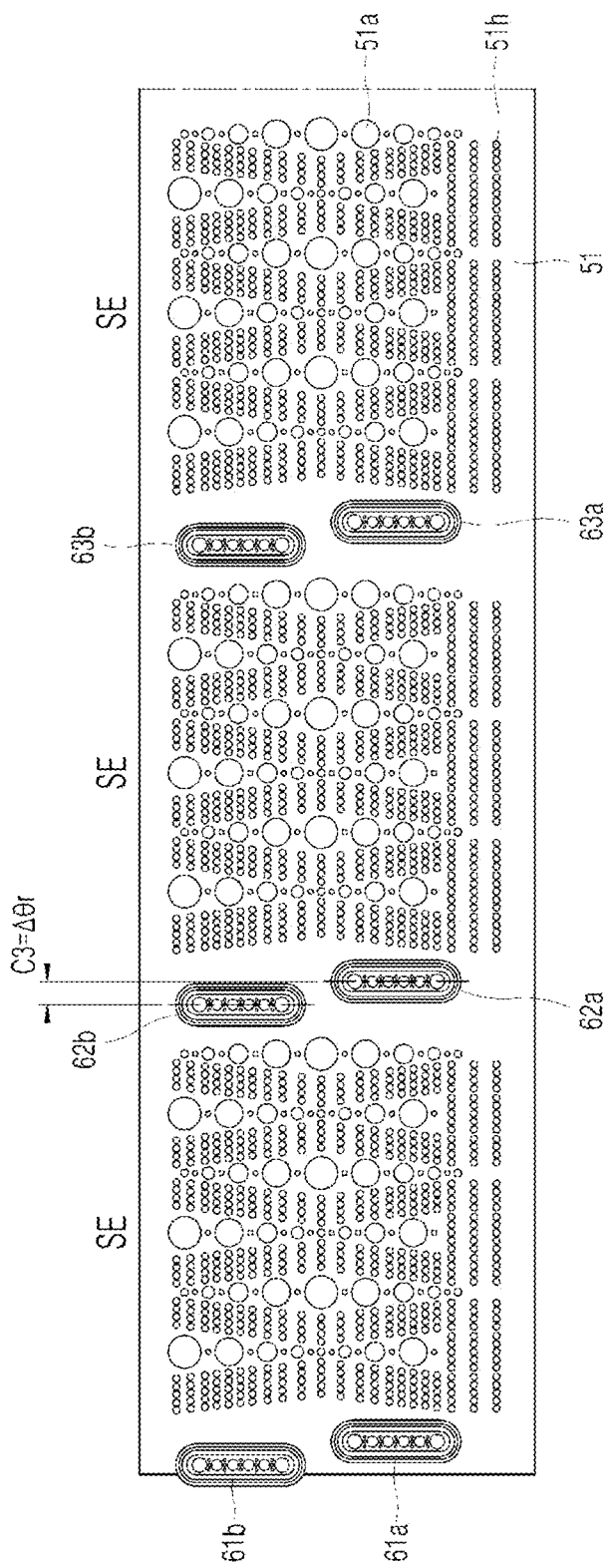
FIG. 9 is a development view of a drum of the laundry treating apparatus according to one embodiment of the present disclosure.

Referring to FIGS. 1 and 9, the plurality of front lifters 61a, 62a, and 63a may respectively be paired (as a set) with the plurality of rear lifters 61b, 62b, and 63b. Three sets of lifters 61 (61a and 61b), 62 (62a and 62b), and 63 (63a and 63b) may be disposed at equal angles about the rotation axis O, but the present disclosure is not necessarily limited thereto. For example, four sets of lifters may be disposed at intervals of 90 degrees about the rotation axis O. Alternatively, five sets of lifters may be disposed at intervals of 72 degrees about the rotation axis O.

Hereinafter, an example in which the front lifters 61a, 62a, and 63a and the rear lifters 61b, 62b, and 63b have the same structure as each other will be described, but the present disclosure is not necessarily limited thereto.

Figure 2:
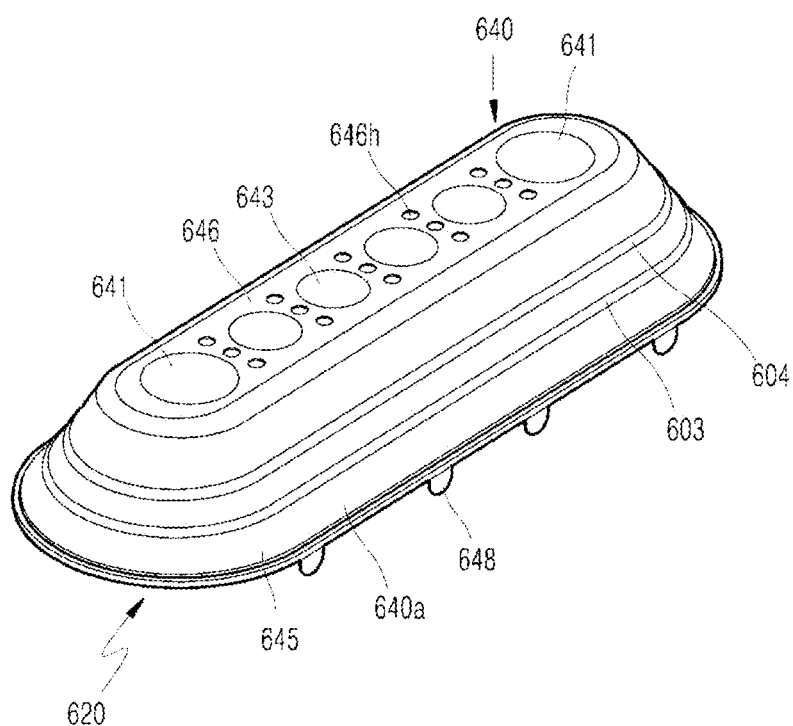
FIG. 2 is a perspective view of a lifter illustrated in FIG. 1.
Figure 3:
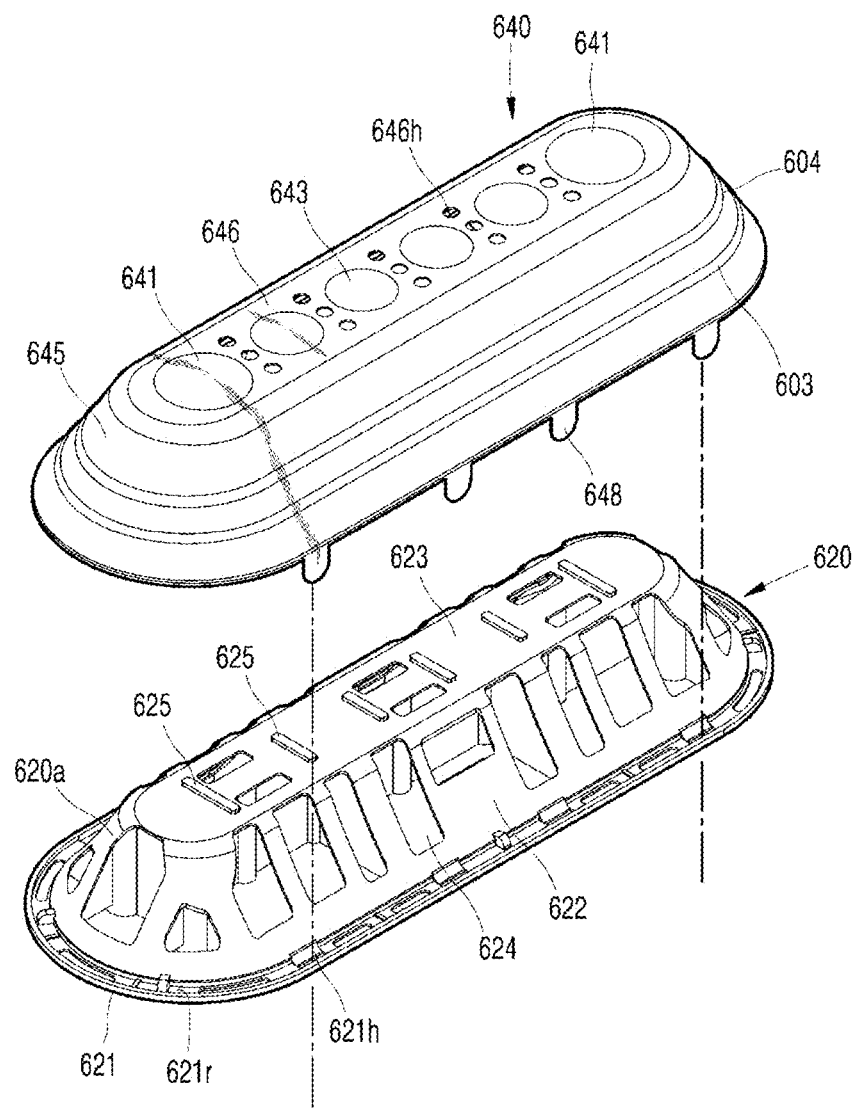
FIG. 3 is an exploded perspective view of the lifter illustrated in FIG. 2.

Referring to FIGS. 2 to 3, each of the lifters 61a, 61b, 62a, 62b, 63a, and 63b may include a lifter frame 620 fixed to the drum 51, and a frame cover 640 configured to cover the lifter frame 620. The frame cover 640 may be a component that protrudes radially inward (or, toward a center of the drum 51) from the inner circumferential surface of the drum 51 and comes into contact with the laundry in the drum 51. The frame cover 640 may be fixed to the drum 51 not directly but by means of the lifter frame 620.

The lifter frame 620 may be made of a synthetic resin material. Preferably, the lifter frame 620 may be formed by injection molding, but the present disclosure is not necessarily limited thereto.

A lifter made of a metal material may be not only excellent in strength, but also luxurious and hygienic. In a case where the metallic lifter is to be coupled directly to the drum made of a metal material, the lifter should be welded to the drum when the drum is in a metal plate state, that is, before the metal plate is rolled up to form the drum. After the lifter is welded to the metal plate, the metal plate will be rolled up to a cylindrical shape, and then two opposite sides of the metal plate will be welded together to form the drum. When the metallic lifter is coupled to the drum in this manner, however, as the metal plate is rolled up, a curved surface is formed, and thus stress is applied to the welded portion between the lifter and the drum, which may damage the welded portion such that the lifter is separated from the drum.

In order to address this issue, the present disclosure proposes fixing the frame cover 640 made of a metal material to the drum 51 by means of the lifter frame 620 made of a synthetic resin material.

Figure 4:
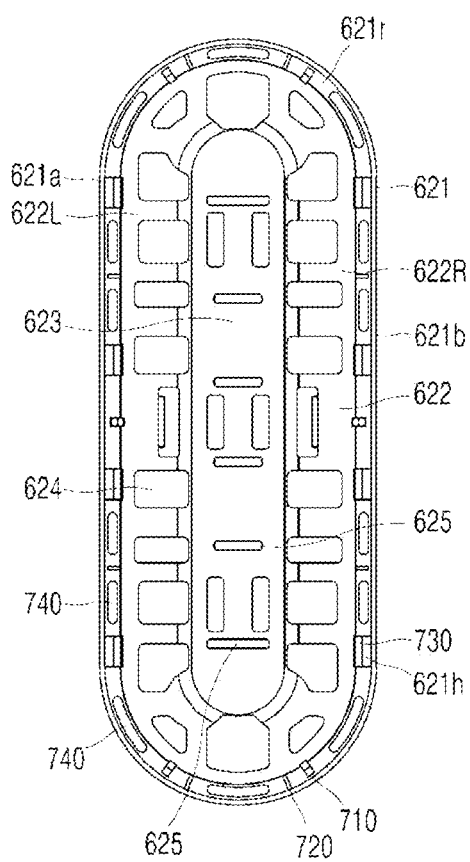
FIG. 4 is a plane view of a lifter frame of the laundry treating apparatus according to one embodiment of the present disclosure.
Figure 5:
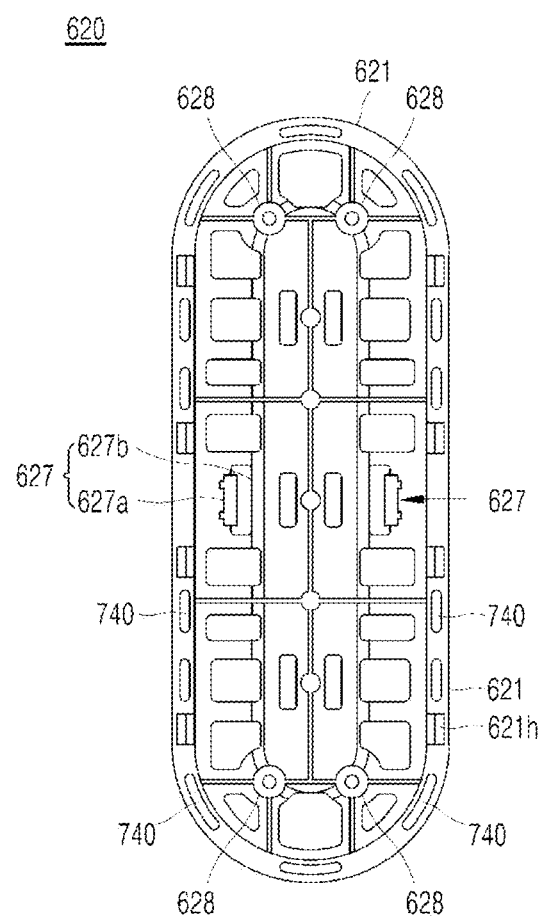
FIG. 5 is a bottom view of the lifter frame of the laundry treating apparatus according to one embodiment of the present disclosure.

Referring to FIGS. 3 to 5, the lifter frame 620 may be formed to have an outer surface 620a of a convex shape as a whole, and an inner surface of a concave shape. Specifically, the lifter frame 620 may include a frame base 621, a frame upper plate 623, and a frame sidewall 622.

The frame base 621 may be fixed to the inner circumferential surface of the drum 51. The frame base 621 may be formed in a ring shape with a central portion thereof open (alternatively, in a shape closed by a single line).

The frame upper plate 623 may be spaced apart from the frame base 621 in a direction towards the center of the drum 51, and may be connected to the frame base 621 by the frame sidewall 622. The frame sidewall 622 may be formed in a tubular (or cylindrical) shape. A lower end of the frame sidewall 622 may be connected to the frame base 621, and an upper end of the frame sidewall 622 may be connected to the frame upper plate 623.

The frame sidewall 622 may be formed in such a shape that a cross-sectional contour of the frame sidewall 622 becomes gradually smaller in an upward direction (or in the radial direction of the drum 51) from the lower end connected to the frame base 621 (or in a direction away from the inner circumferential surface of the drum 51). The cross-sectional contour of the frame sidewall 622 may be the smallest at a portion where the frame sidewall 622 meets the frame upper plate 623.

At least one water flow inlet hole may be formed in the drum 51 such that the washing water stored in the water storage tub 31 is introduced to an inside of the frame cover 640 through the water flow inlet hole. Any opening that is formed in the drum 510 at a region covered by the frame cover 640 may be the water flow inlet hole. For example, a through hole 51h that is positioned to be covered by the frame cover 640 may be the water flow inlet hole. In addition, mounting slots 511a and 511b and a fastening hole 513, which will be described in detail below, may also be the water flow inlet hole.

At least one water flow through hole 624 may be formed in the lifter frame 620. Any opening may be the water flow through hole 624, as long as the opening is formed in the lifter frame 620 and connects the inside and the outside of the lifter frame 620.

The water flow through hole 624 may be formed in the frame sidewall 622 and/or the frame upper plate 623. The washing water received in a concave space of the lifter frame 620 may be discharged through the water flow through hole 624.

Here, a water flow through hole 624 that is formed in the frame upper plate 623 will be referred to as a first water flow through hole, and a water flow through hole 624 that is formed in the frame sidewall 622 will be referred to as a second water flow through hole.

At least one water flow discharge hole 646h for discharging the washing water in the lifters 61a, 61b, 62a, 62b, 63a, and 63b into the drum 51 may be formed in the frame cover 640. The washing water in the concave space of the lifter frame 620 may pass through the water flow through hole 624, and then may be discharged into the drum 51 through the water flow discharge hole 646h.

An outer surface 640a of the frame cover 640, which is exposed to the inside of the drum 51 and comes into contact with the laundry in the drum 51, may have a convex shape, and an inner surface of the frame cover 640 may have a concave shape to correspond to the convex shape of the outer surface 620a of the lifter frame 620. The frame cover 640 may be made of a metal material, and preferably of stainless steel, but the present disclosure is not limited thereto. The frame cover 640 may be formed by plastically processing (for example, pressing) a metal plate having a predetermined thickness.

The frame cover 640 may include a cover sidewall 645 extending upward from a lower end of the frame cover 640, which is in contact with the frame base 621, and a cover upper plate 646 configured to close an upper side of the cover sidewall 645. The cover upper plate 646 may be approximately parallel to the frame upper plate 623. In particular, the cover upper plate 646 may be formed to have a corresponding surface to the frame upper plate 623, wherein the corresponding surface may be parallel to the frame upper plate 623 and may have substantially the same surface area as that of the frame upper plate 623. The water flow discharge hole 646h may be provided as a plurality of water flow discharge holes 646h, and the plurality of water flow discharge holes 646h may be formed in the cover upper plate 646.

The cover sidewall 645 may be formed in such a shape that a cross-sectional contour of the cover sidewall 645 becomes gradually smaller in the upward direction (or in the radial direction of the drum 51) from the lower end of the frame cover 640 (or in the direction away from the inner circumferential surface of the drum 51). The cross-sectional contour of the cover sidewall 645 may be the smallest at a portion where the cover sidewall 645 meets the cover upper plate 646. Here, the cover sidewall 645, too, may be formed to have a corresponding surface to the frame sidewall 622, wherein the corresponding surface is parallel to the frame sidewall 622.

As such, since the lifter frame 620 and the frame cover 640 are formed in such a shape that the upper surfaces and the lateral surfaces thereof correspond to each other, respectively, the lifter may have relatively higher rigidity, and thus when an external force is applied to the lifter, deformation and damage to the lifter may be minimized.

The lifter frame 620 may include a spacer 625 which protrudes from the frame upper plate 623 so as to space the frame cover 640 apart from the lifter frame 620. The spacer 625 may be provided as a plurality of spacers 625 and may protrude from the frame upper plate 623 towards the inner surface of the frame cover 640.

The inner surface of the frame cover 640 may be spaced apart from the frame upper plate 623 by a distance equal to or greater than a protruding length (or height) of the spacer 625 from the frame upper plate 623. The spacer 625 may be spaced apart from the inner surface of the frame cover 640 by a predetermined distance. Here, the inner surface of the frame cover 640 may be spaced apart from the frame upper plate 623 by a distance equal to the sum of the height of the spacer 625 and a distance between the spacer 625 and the inner surface of the frame cover 640. Accordingly, when the frame cover 640 is pressed by an external force, the frame cover 640 may come into contact with the frame upper plate 623, and thus any further deformation of the frame cover 640 may be prevented.

Alternatively, the spacer 625 may be configured to be in contact with the frame cover 640, depending on the embodiment. Here, the spacer 625 may protrude from the outer surface 620a of the lifter frame 620 and contact the inner surface of the frame cover 640. Since the spacer 625 supports the inner surface of the frame cover 640 while the frame upper plate 623 is spaced apart from the frame cover 640, a state in which the frame cover 640 is spaced apart from the frame upper plate 623 may be maintained even when the frame cover 640 is pressed toward the lifter frame 620 by an external force.

The spacer 625 may have a linear rib structure. In detail, the spacer 625 may be formed in the shape of a linear rib extending in a width direction (or a left-right direction) of the lifter frame 620 on the frame upper plate 623. Accordingly, foreign substances may be prevented from accumulating in a portion of the frame upper plate 623 at which the spacer 625 protrudes.

The inner surface of the cover upper plate 646 may be spaced apart from the outer surface of the frame upper plate 623. That is, a predetermined separation space may be formed between the inner surface of the cover upper plate 646 and the outer surface of the frame upper plate 623, and the separation space may serve as a flow path that guides the washing water to the water flow discharge hole 646h.

A separation space may also be formed between the frame sidewall 622 and the cover sidewall 645. A seating groove 621r (see FIG. 4), which will be described in detail below, may be formed in the frame base 621 at a position that is spaced outward from the frame sidewall 622 by a predetermined distance. Accordingly, a lower end of the cover sidewall 645 which is located in the seating groove 621r may be spaced apart from the frame sidewall 622. Since the frame cover 640 is spaced apart from the frame sidewall 622 at the lower end of the frame cover 640 by the seating groove 621r, and the cover upper plate 646 is spaced apart from the frame upper plate 623 by the spacer 625, it can be said that the frame cover 640 is forcibly spaced apart from the lifter frame 620 at two points: at the lower end of the frame cover 640, and at a portion of the frame cover 640 that is supported by the spacer 625. As a result, the cover sidewall 645, which is positioned between the two points, may also be maintained to be spaced apart from the lifter frame 620.

The washing water introduced into the lifters 61a, 61b, 62a, 62b, 63a, and 63b may be introduced into the separation spaces, and a water flow that is formed in the separation spaces while the washing tub 50 is rotating may clean the outer surface of the lifter frame 620 and the inner surface of the frame cover 640. Foreign substances that are produced during this cleaning process may be discharged through the water flow discharge hole 646h formed in the frame cover 640 or through the water flow inlet hole formed in the drum 51. As a flow path is formed between the lifter frame 620 and the frame cover 640 by the separation spaces, this may be relatively more advantageous in terms of keeping the lifters 61a, 62a, 63a, 61b, 62b, and 63b clean.

In particular, since the water flow through hole 624 is formed at a position other than where the water flow discharge hole 646h is formed (the second water flow through hole is formed in the frame sidewall 622), the lifters 61a, 61b, 62a, 62b, 63a, and 63b may have relatively more diverse flow paths along which the washing water is guided to the separation spaces between the lifter frame 620 and the frame cover 640 and then is discharged to the drum 51.

In a case in which the water flow through hole 624 and the water flow discharge hole 646h are formed to correspond to each other, the washing water that is guided to the separation spaces between the lifter frame 620 and the frame cover 640 may be relatively quickly discharged into the drum 51 through almost the shortest route.

When the washing water is relatively quickly discharged into the drum 51 through almost the shortest route, however, an effect of cleaning an inside of the lifters cannot be anticipated. In this regard, there is a need for the washing water to flow in the separation spaces between the lifter frame 620 and the frame cover 640 for as long a time as possible through relatively more diverse routes.

Thus, if the water flow through hole 624 is formed not only at a position corresponding to the water flow discharge hole 646h but also at a position other than the position corresponding to the water flow discharge hole 646h, the effect of cleaning the inside of the lifters 61a, 61b, 62a, 62b, 63a, and 63b may be improved.

Here, it may be preferable that the number of water flow through holes 624 is larger than the number of water flow discharge holes 646h.

In addition, it may be preferable that an opened size of the water flow discharge hole 646h is smaller than an opened size of the water flow through hole 624.

Forming the water flow through hole 624 and the water flow discharge hole 646h in such a manner may be relatively more advantageous in terms of keeping the inside of the lifters 61a, 62a, 63a, 61b, 62b, and 63b clean, since the washing water may be easily circulated in the separation spaces between the lifter frame 620 and the frame cover 640.

Further, when it comes to positions of the water flow through hole 624 in the frame upper plate 623 and the water flow discharge hole 646h in the cover upper plate 646, it may be more preferable that the water flow through hole 624 and the water flow discharge hole 646h do not completely correspond to each other along a vertical direction perpendicular to the inner circumferential surface of the drum 51.

By disposing the water flow through hole 624 and the water flow discharge hole 646h in such a manner that the water flow through hole 624 and the water flow discharge hole 646h do not completely correspond to each other when the lifter is viewed from above, the effect of cleaning the inside of the lifters 61a, 61b, 62a, 62b, 63a, and 63b may be further improved, because the route along which the washing water in the lifters is discharged becomes more complicated.

In addition, the frame sidewall 622 may connect the frame upper plate 623 and the frame base 621 in an inclined manner. To this end, the frame upper plate 623 may be formed to be relatively smaller than the frame base 621 such that a horizontal projection plane of the frame upper plate 623 is positioned within a circumference of the frame base 621.

Further, in a case in which the frame sidewall 622 is formed to be inclined, the cover sidewall 645 which corresponds to the frame sidewall 622 may also be formed to be inclined.

Since the frame sidewall 622 and the cover sidewall 645 are formed to be inclined as described above, the washing water passing through the water flow through hole 624 may clean the inside of the lifters while colliding with the inclined surfaces of the frame sidewall 622 and the cover sidewall 645, and the washing water may be naturally guided towards the water flow discharge hole 646h along the inclined surfaces.

Figure 6:
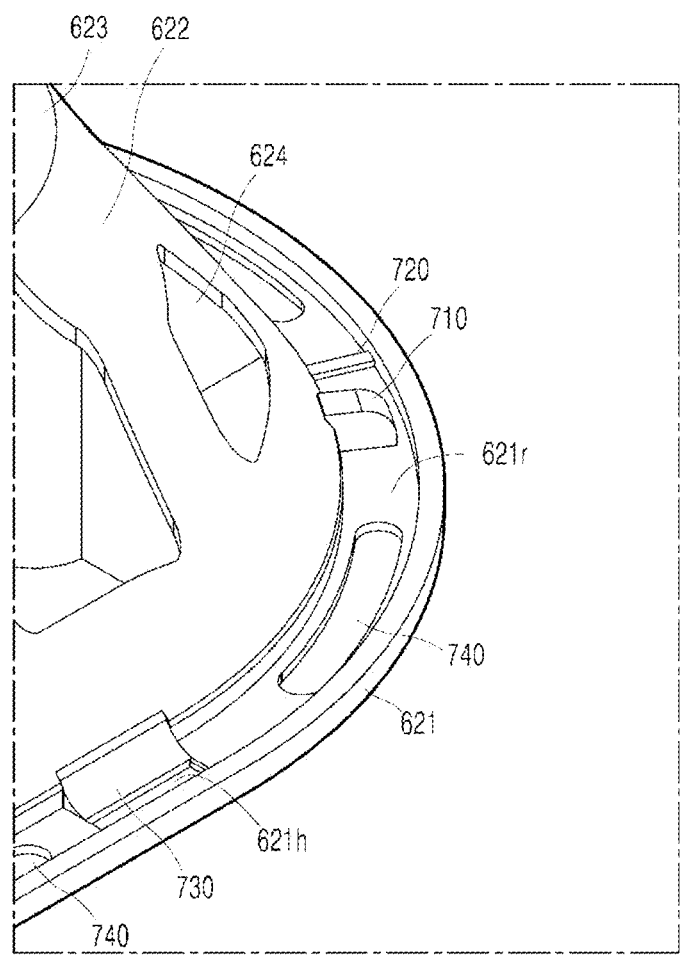
FIG. 6 is a view illustrating in more detail the lifter frame of the laundry treating apparatus according to one embodiment of the present disclosure.
Figure 7:
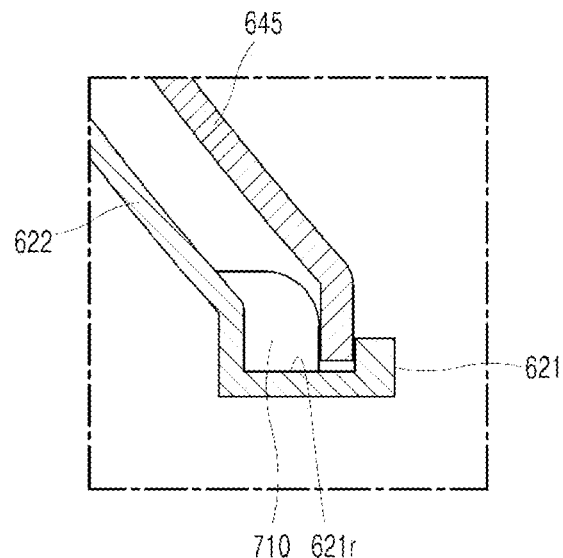
FIGS. 7 and 8 are views illustrating a state in which a lifter cover has been mounted to a seating groove of the lifter frame in the laundry treating apparatus according to one embodiment of the present disclosure.
Figure 8:
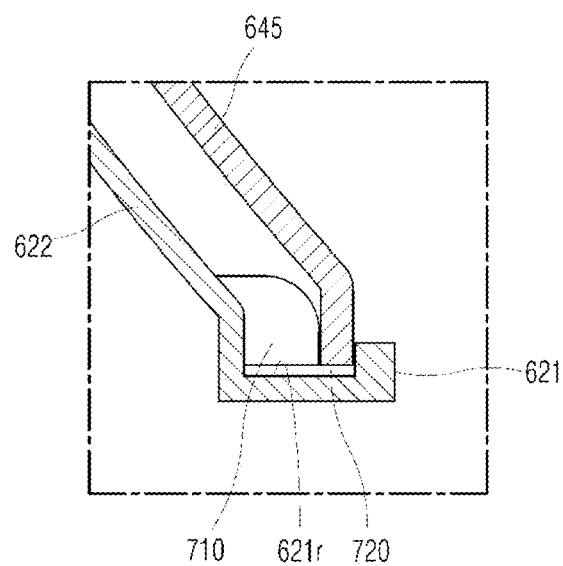

Referring to FIGS. 6 to 8, a spacing rib 710 may be protrudingly formed in the seating groove 621r so as to space the inner surface of the frame cover 640 apart from the outer surface of the lifter frame 620.

Accordingly, a constant distance between the lifter frame 620 and the frame cover 640, which form the lifters 61a, 61b, 62a, 62b, 63a, and 63b, may be maintained, and thus foreign substances may be prevented from accumulating between the lifter frame 620 and the frame cover 640.

In the laundry treating apparatus according to the present embodiment of the present disclosure, the spacing rib 710 may be protrudingly formed in the seating groove 621r of the lifter frame 620 to which the frame cover 640 is mounted, so as to space the inner surface of the frame cover 640 apart from the outer surface of the lifter frame 620. Accordingly, foreign substances may be prevented from accumulating between the frame cover 640 and the lifter frame 620.

Here, a protruding surface of the spacing rib 710 may be formed to include a curved surface. That is, as the protruding surface of the spacing rib 710 is formed of a curved surface, the frame cover 640 may slide along the protruding surface of the spacing rib 710 while being mounted to the seating groove 621r. Accordingly, the frame cover 640 and the lifter frame 620 may be more smoothly assembled.

Alternatively, the seating groove 621r may extend in a shape of a looped curve along the circumference of the frame base 621, and the spacing rib 710 may be disposed in a curved portion of the frame base 621.

That is, as the spacing rib 710 is disposed in a curved portion of the frame base 621, the spacing rib 710 may space the frame cover 640 apart from the lifter frame 620 in relatively more directions in a plane view of the frame base 621.

In addition, as illustrated in FIGS. 4 to 6, in the laundry treating apparatus according to the present embodiment of the present disclosure, a drain hole 740 configured to communicate an upper surface and a lower surface of the frame base 621 with each other may be formed in the seating groove 621r.

Accordingly, foreign substances may be prevented from accumulating in the seating groove 621r, which is provided for coupling of the frame cover 640 and the lifter frame 620.

As described above, as the drain hole 740 configured to communicate the upper surface and the lower surface of the frame base 621 with each other is formed in the seating groove 621r, water and foreign substances introduced into the seating groove 621r may be discharged through the drain hole 740. Accordingly, foreign substances may be prevented from accumulating in the seating groove 621r of the lifter frame 620, and thus the seating groove 621r may be prevented from being contaminated.

Here, the drain hole 740 may be formed as a plurality of drain holes 740, and the plurality of drain holes 740 may be formed in the seating groove 621r in an intermittent manner. That is, as shown in FIGS. 4 to 6, the plurality of drain holes 740 may be formed individually, not being connected to one another along the seating groove 621r.

As described above, since the plurality of drain holes 740 for discharging foreign substances are formed in such an intermittent manner, degradation of structural rigidity may be minimized.

Domes 641 and 643 may be formed in the frame cover 640 at positions corresponding to the spacers 625. That is, the spacers 625 may be disposed below the domes 641 and 643.

In a case in which a plurality of spacers 625 are formed as in the present embodiment, a plurality of domes 641 and 643 may be formed at the positions corresponding to the plurality of spacers 625, respectively.

The domes 641 and 643 may be formed on the cover upper plate 646. An inner surface of each of the domes 641 and 643 which faces the spacers 625 may be formed to be concave, and an outer surface of each of the domes 641 and 643 may be formed to be convex. The concave inner surface of each of the domes 641 and 643 may be spaced apart from the spacers 625. However, the present disclosure is not limited thereto, and the spacers 625 may be in contact with the concave inner surface of the domes 641 and 643.

The domes 641 and 643 may be formed to be convex by pressing the cover upper plate 646 made of a metal material. The plurality of domes 641 and 643 may be disposed along a longitudinal direction of the cover upper plate 646 (or along a longitudinal direction of the lifters 61a, 61b, 62a, 62b, 63a, and 63b). At least one water flow discharge hole 646h, which was described in detail above, may be formed between two adjacent domes 641 and 643.

Assuming that the cover upper plate 646 has a plurality of sections divided along the longitudinal direction thereof, the water flow discharge hole 646h may be formed in each of the plurality of sections. In the present embodiment of the present disclosure, three (that is, a plurality of) water flow discharge holes 646h are formed in each of three sections, and the three water flow discharge holes 646h in each section are arranged in a width direction of the cover upper plate 646.

The spacers 625 may be positioned between the plurality of sections. That is, when the cover upper plate 646 is viewed from above, the spacers 625 may be positioned between every two adjacent sections among the plurality of sections.

The domes 641 and 643 may include two or more domes of which a depth of a concave portion of the inner surface is different from each other. In more detail, the domes 641 and 643 may include a larger dome 641 of which the concave portion has a first depth, and a smaller dome 643 of which the concave portion has a second depth smaller than the first depth. A height of a spacer 625 that corresponds to the larger dome 641 may be greater than a height of a spacer 625 that corresponds to the smaller dome 643.

The domes 641 and 643 may include two or more domes having different sizes. The domes 641 and 643 may be formed in a circular shape, but the present disclosure is not necessarily limited thereto. Here, the "size" may indicate a size of the domes 641 and 643 when the concave portions of the inner surfaces are viewed from above. For example, the "size" may indicate a diameter of the concave portions. Here, an inner diameter and an outer diameter of the domes 641 and 643 may be different from each other, but the difference may be caused substantially by a difference in thicknesses of the domes 641 and 643. Therefore, it is safe to say that the size of the domes 641 and 643 indicates the outer diameter of the domes 641 and 643.

A size of the spacer 625 may vary depending on the size of the domes 641 and 643. That is, in a case in which the larger dome 641 and the smaller dome 643 are provided, a size of the spacer 625 that corresponds to the larger dome 641 may be greater than a size of the spacer 625 that corresponds to the smaller dome 643.

A plurality of smaller domes 643 may be positioned between a pair of larger domes 641, and the water flow discharge hole 646h may be formed between the domes 641 and 643. A plurality of water flow discharge holes 646h may be arranged along a direction that crosses the lifters 61a, 61b, 62a, 62b, 63a, and 63b (or in a direction orthogonal to the longitudinal direction of the lifters 61a, 61b, 62a, 62b, 63a, and 63b).

Since the domes 641 and 643 have a shape protruding from the cover upper plate 646, even when the laundry is placed on the domes 641 and 643, a gap between the laundry and a surface portion of the cover upper plate 646 around the water flow discharge holes 646h may be maintained. Accordingly, the water flow discharge holes 646h may be prevented from being clogged with the laundry, and the water that is discharged to the gap through the water flow discharge holes 646h may be applied to the laundry.

The water stored in the water storage tub 31 may be introduced into the lifters 61a, 61b, 62a, 62b, 63a, and 63b through the water flow input hole. The lifter frame 620 may have a structure in which at least one water flow through hole 624 is formed. The water that is introduced into the lifters 61a, 61b, 62a, 62b, 63a, and 63b may reach the water flow discharge hole 646h after passing through the water flow through hole 624.

The lifters 61a, 61b, 62a, 62b, 63a, and 63b may be raised by rotation of the washing tub 50 in a state in which the washing water has been introduced into the lifters 61a, 61b, 62a, 62b, 63a, and 63b, and while the lifters 61a, 61b, 62a, 62b, 63a, and 63b are being raised, the washing water in the lifters may be discharged (or sprayed) through the water flow discharge hole 646h.

Referring to FIGS. 2 and 3, each of the lifters 61a, 61b, 62a, 62b, 63a, and 63b may include a lifter upper plate portion spaced apart from the inner circumferential surface of the drum 51, and a lifter sidewall portion of which a lower end is in contact with the inner circumferential surface of the drum 51, and of which an upper end is connected to the lifter upper plate portion. One or more washing protrusions 603 and 604 may be formed on the lifter sidewall portion. The washing protrusions 603 and 604 may protrude from an outer surface of the lifter sidewall portion and may be extended along the outer surface of the lifter sidewall portion in the form of a ring.

In a case in which each of the lifters 61a, 61b, 62a, 62b, 63a, and 63b includes the lifter frame 620 and the frame cover 640 as in the present embodiment, the cover upper plate 646 and the cover sidewall 645 of the frame cover 640 may become the lifter upper plate portion and the lifter sidewall portion, respectively.

Since each of the washing protrusions 603 and 604 is formed in the form of a ring, the lifters 61a, 61b, 62a, 62b, 63a, and 63b may not be easily deformed even when an external force is applied thereto in any direction. In particular, even in a case in which the frame cover 640 is made of a relatively thin metal plate (for example, stainless steel), sufficient rigidity may be maintained.

The frame cover 640 may include one or more washing protrusions 603 and 604 of a ring shape protruding from the outer surface of the cover sidewall 645, or washing rings. A plurality of washing protrusions 603 and 604 may be disposed in parallel to each other. Two washing protrusions 603 and 604 are provided in the present embodiment, but the present disclosure is not necessarily limited thereto. In a case in which the frame cover 640 is made of a metal material, the washing protrusions 603 and 604 may be formed by a pressing process.

Each of the washing protrusions 603 and 604 may have a shape corresponding (or similar) to the contour of the cover sidewall 645, and preferably, may protrude to a predetermined height from the cover sidewall 645. Since the contour of the cover sidewall 645 becomes gradually smaller in the upward direction, a washing protrusion that is positioned above the other washing protrusion may be smaller in size than the other washing protrusion.

A frictional force generated between the laundry and the washing protrusions 603 and 604 may cause an effect of rubbing the laundry, to thereby improve the washing effect. In addition, even in a case in which the lifters 61a, 61b, 62a, 62b, 63a, and 63b are formed to have a relatively smaller height compared to lifters in the related art, since the washing protrusions 603 and 604 compensate for any reduction in effect of lifting up the laundry caused by the smaller height of the lifters, the same level of physical force (for example, force of lifting up or striking the laundry) as that in the related art may be applied to the laundry.

The frame cover 640 may be coupled to the lifter frame 620. Referring to FIGS. 2 and 3, at least one coupling tab 648 may be formed at the lower end of the frame cover 640. The coupling tab 648 may be formed at a left side or a right side in the lower end of the frame cover 640 when the frame cover 640 is viewed from the front side. Each of the left side and the right side of the frame cover 640 may be a straight section extending in the front-rear direction.

Referring to FIGS. 4 and 5, a tab binding port 621h may be formed in the lifter frame 620 such that the coupling tab 648 passes through the tab binding port 621h from above. A plurality of tab binding ports 621h may be formed in the lifter frame 620 at positions corresponding to a plurality of coupling tabs 648, respectively. The lifter frame 620 and the frame cover 640 may be coupled to each other by passing the coupling tab 648 through the tab binding port 621h and then bending a portion of the coupling tab 648 that has passed through the tab binding port 621h, such that the bent portion of the coupling tab 648 is caught by a rim of the tab binding port 621h (or by a bottom surface of the frame base 621).

Meanwhile, the seating groove 621r may be formed in the frame base 621 of the lifter frame 620 in a shape corresponding to the lower end of the frame cover 640. The lower end of the frame cover 640 may be inserted and mounted to the seating groove 621r. Here, the tab binding port 621h may be formed in the seating groove 621r.

As illustrated in FIG. 6, a tab guide portion 730 may be protrudingly formed in the frame sidewall 622 in a shape including an inclined surface towards the tab binding port 621h.

Accordingly, in a process in which the coupling tab 648 of the frame cover 640 is inserted into the tab binding port 621h of the lifter frame 620, the coupling tab 648 may slide along the inclined surface of the tab guide portion 730 formed in the frame sidewall 622. Therefore, the frame cover 640 and the lifter frame 620 may be more smoothly assembled.

In addition, in the laundry treating apparatus according to the present embodiment, a stepped portion may be formed in the bottom surface of the frame base 621 at a portion in which the tab binding port 621h is formed, and may have a shape corresponding to the coupling tab 648.

That is, as illustrated in FIG. 5, the stepped portion may be formed in the bottom surface of the frame base 621 such that the coupling tab 648 that has been inserted into the tab binding port 621h is bent and mounted to the stepped portion. Accordingly, the assembled state of the frame cover 640 and the lifter frame 620 may be more stably maintained.

In addition, in the laundry treating apparatus according to the present embodiment, a supporting rib 720 may be formed on an inner bottom surface of the seating groove 621r. The supporting rib 720 may be formed to protrude to a height smaller than a depth of the seating groove 621r, and a lower end portion of the cover sidewall 645 may be mounted to the supporting rib 720.

That is, as illustrated in FIGS. 6 and 8, as the supporting rib 720 is protrudingly formed on the inner bottom surface of the seating groove 621r, the lower end portion of the frame cover 640 may be supported by the supporting rib 720 while spaced apart from the inner bottom surface of the seating groove 621r. Accordingly, the structural stability may be increased by forming the frame cover 640 such that a length of the lower end of the frame cover 640 is smaller than a length of the seating groove 621r.

Furthermore, in the laundry treating apparatus according to the present embodiment, the supporting rib 720 may be formed between two adjacent drain holes 740.

That is, as illustrated in FIGS. 4 to 6, as the supporting rib 720 is formed between two adjacent drain holes 740, the lower end of the frame cover 640 which is mounted around the drain hole 740 may be maintained to be spaced apart from the drain hole 740 so as not to interrupt discharge of foreign substances through the drain hole 740.

Hereinafter, a structure in which the lifter frame 620 and the drum 51 are coupled to each other will be described.

Referring to FIGS. 4 and 5, at least one insertion protrusion 627 may be formed on the front lifters 61a, 62a, and 63a and/or the rear lifters 61b, 62b, and 63b.

A plurality of front or rear lifters 61a, 62a, 63a, 61b, 62b, and 63b may be disposed along a circumferential direction of the drum 51. Corresponding to this, a group of front lifter installation elements may be disposed along the circumferential direction, and likewise, a group of rear lifter installation elements may be disposed along the circumferential direction.

Hereinafter, a mounting slot belonging to the group of front lifter installation elements will be referred to as a front mounting slot 511a, and a mounting slot belonging to the group of rear lifter installation elements will be referred to as a rear mounting slot 511b.

Referring to FIGS. 4 to 5, the insertion protrusion 627 may protrude from the frame base 621. The insertion protrusion 627 may include a vertical portion 627a (see FIG. 11) protruding downward from the bottom surface of the frame base 621, and a catching portion 627b bent from the vertical portion 627a in the horizontal direction. When viewed from above, the catching portion 627b may have a shape protruding toward a center of the ring-shaped frame base 621.

When the lifter frame 620 is viewed from the front side, the insertion protrusion 627 may be formed at each of left and right sides of the frame base 621. Two or more insertion protrusions 627 may be formed along one side of the frame base 621 (or in the front-rear direction).

Specifically, an insertion protrusion 627(L) that is formed at the left side of the frame base 621 may include a catching portion 627b that is bent to the right. On the contrary, an insertion protrusion 627(R) that is formed at the right side of the frame base 621 may include a catching portion 627b that is bent to the left.

Figure 11:
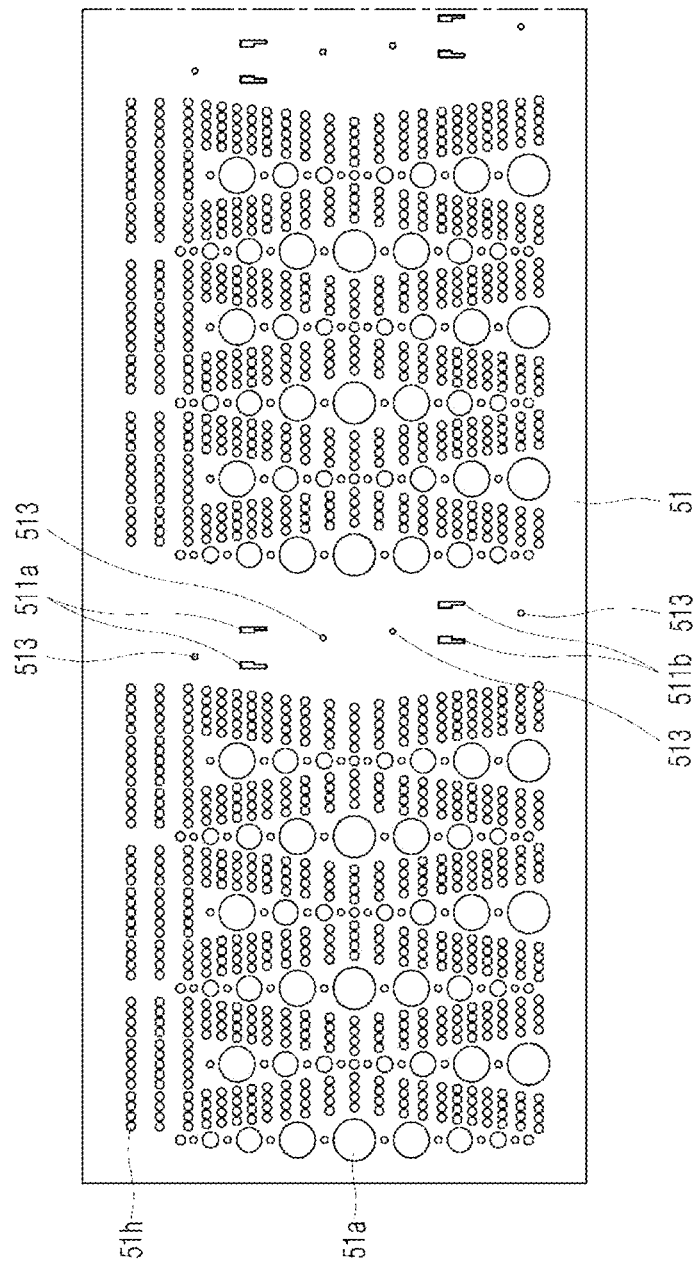
FIG. 11 is a view illustrating a state in which the lifters have been separated from the drum illustrated in FIG. 9.
Figure 12:
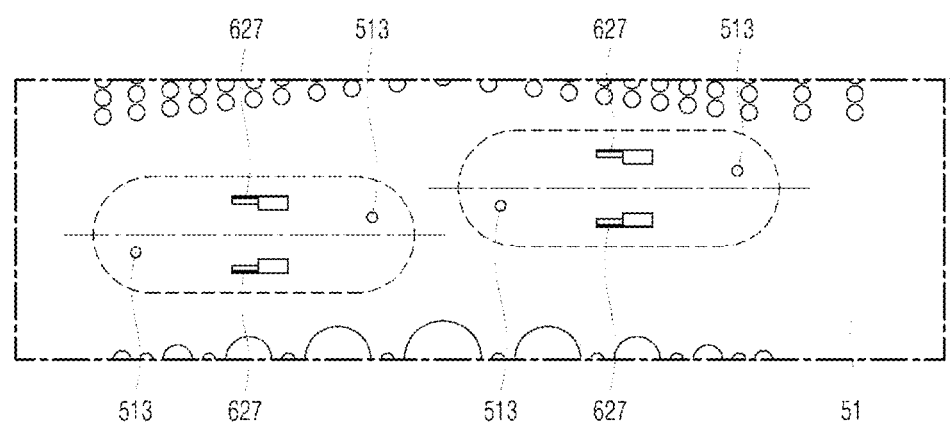
FIG. 12 is a view illustrating in more detail a bottom surface of the drum illustrated in FIG. 9.

Referring to FIGS. 11 and 12, each of the mounting slots 511a and 511b may be formed to extend approximately in the front-rear direction of the drum 51. Each of the mounting slots 511a and 511b may include an insertion section having a predetermined width and a settlement section extending rearward or forward from the insertion section and having a width smaller than the width of the insertion section.

Meanwhile, referring to FIGS. 11 to 12, in a process of installing the lifter frame 620 in the drum 51, when the insertion protrusion 627 of the lifter frame 620 is passed through the insertion section and pushed in, the vertical portion 627a may be moved in the front direction of the drum 51 along the settlement section, and the catching portion 627b may be positioned below the settlement section. Here, the bottom surface of the frame base 621 may be in close contact with the inner circumferential surface of the drum 51, and the catching portion 627b may not be able to pass through the settlement section upward from below the settlement section, because a width of the catching portion 627b is greater than the width of the settlement section.

Referring to FIGS. 4 to 5, the frame sidewall 622 may include a sidewall left portion 622L of which a lower end is connected to a left side 621a of the frame base 621, and a sidewall right portion 622R of which a lower end is connected to a right side 621b of the frame base 621. At least one of the sidewall left portion 622L or the sidewall right portion 622R may make an acute angle with the frame base 621. Preferably, the sidewall left portion 622L and the sidewall right portion 622R may be symmetric with each other when viewed from the front side.

Referring to FIG. 5, a fastening boss 628 may be formed in at least one of the front lifters 61a, 62a, and 63a or the rear lifters 61b, 62b, and 63b. The fastening boss 628 may protrude downward from the inner surface of the lifter frame 620. The fastening boss 628 may extend from the frame upper plate 623. The fastening boss 628 may be provided as two or more fastening bosses 628 spaced apart from each other along the front-rear direction.

Referring to FIGS. 11 and 12, a fastening hole 513 may be formed in the drum 51.

After the lifter frame 620 has been temporarily assembled by inserting the insertion protrusion 627 into the mounting slot 511a, a screw may be passed through the fastening hole 513 from the outside of the drum 51 and then fastened to the fastening boss 628, to thereby complete installation of the lifter frame 620.

In the laundry treating apparatus according to the present embodiment, a pair of insertion protrusions 627 may be formed to protrude from the inner surface of the lifter frame 620 in a central portion of the inner surface with respect to the longitudinal direction of the lifter frame 620 in a plane view of the lifter frame 620, and a pair of mounting slots 511a and 511b may be formed in the drum 51, wherein the drum 51 may be penetrated to be partially opened at the mounting slots 511a and 511b such that when the lifter frame 620 is coupled to the inner circumferential surface of the drum 51, the pair of insertion protrusions 627 are inserted into the pair of mounting slots 511a and 511b.

That is, the number of the mounting holes formed in the drum 51 for assembling the lifters 61a, 62a, 63a, 61b, 62b, and 63b may be minimized, and the mounting holes may be formed at a portion that is not a weak portion in the drum 51.

In the laundry treating apparatus according to the present embodiment, only one pair of insertion protrusions 627 may be formed in each of the lifters 61a, 62a, 63a, 61b, 62b, and 63b, and only one pair of mounting slots 511a and 511b, corresponding to the one pair of insertion protrusions 627, may be formed in the drum 51. Accordingly, the weak portion of the drum 51 that becomes vulnerable to buckling as the mounting holes are formed in the drum 51 may be minimized, and thus deformation may be prevented.

Here, the one pair of insertion protrusions 627 may be formed to be symmetric to each other. Accordingly, there may be no restriction in terms of installation direction of the lifters 61a, 62a, 63a, 61b, 62b, and 63b installed in the drum 51.

As described above, in the laundry treating apparatus according to the present embodiment, one pair of the insertion protrusions 627 may be formed to be symmetric to each other in the central portion of the lifter frame 620 in the plane view of the lifter frame 620. Accordingly, when the lifters 61a, 62a, 63a, 61b, 62b, and 63b are installed, the installation may be more smoothly carried out regardless of the installation direction.

In the laundry treating apparatus according to the present embodiment, the fastening hole 513 may be provided as a pair of fastening holes 513 formed and arranged diagonally to each other with respect to a center line along the longitudinal direction of the lifters 61a, 62a, 63a, 61b, 62b, and 63b.

That is, as illustrated in FIG. 12, with respect to the center line along the longitudinal direction of the lifters 61a, 62a, 63a, 61b, 62b, and 63b, a pair of fastening holes 513 may be disposed diagonally to each other. Accordingly, when the drum 51 is manufactured by rolling up a plate member and welding two opposite sides of the plate member, interference between the weld line and the fastening holes 513 may be prevented from occurring.

Figure 10:
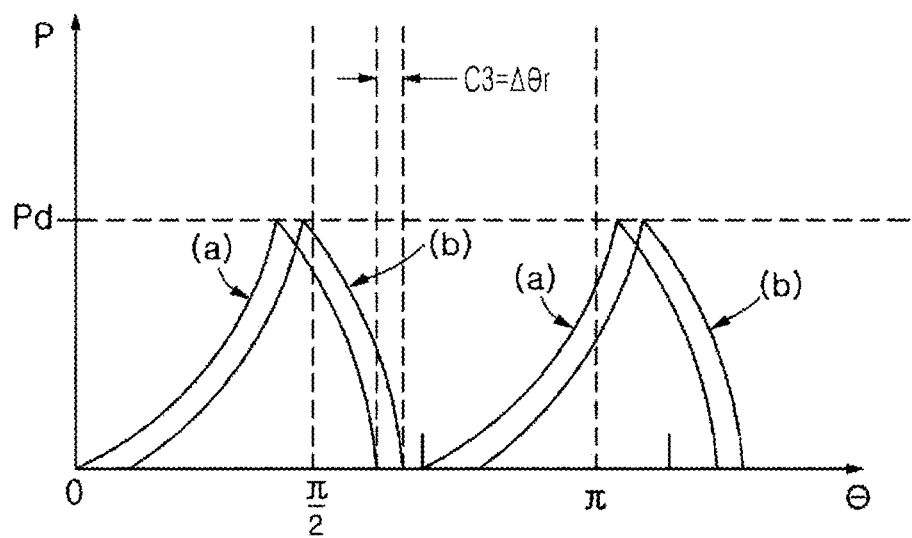
FIG. 10 is a view showing a height change of a first fabric caused by a rear lifter according to rotation angle of the drum (see (a)), and a height change of a second fabric caused by a front lifter, which forms a set together with the rear lifter, according to rotation angle of the drum (see (b)).

FIG. 9 is a development view of the drum 51 of the laundry treating apparatus according to one embodiment of the present disclosure. FIG. 10 is a view showing a height change of a first fabric caused by a rear lifter according to the rotation angle of the drum (see (a)), and a height change of a second fabric caused by a front lifter, which forms a set together with the rear lifter, according to the rotation angle of the drum (see (b)). Hereinafter, description will be made with reference to FIGS. 9 to 10.

Each of the front lifters 61a, 62a, and 63a may be disposed on the inner circumferential surface of the drum 51 and may extend in the front-rear direction. The plurality of front lifters 61a, 62a, and 63a may be disposed at equal angles to each other about the rotation axis O.

The rear lifters 61b, 62b, and 63b may be disposed behind the front lifters 61a, 62a, and 63a on the inner circumferential surface of the drum 51. The same number of the rear lifters 61b, 62b, and 63b as the number of the front lifters 61a, 62a, and 63a may be disposed at equal angles to each other about the rotation axis O.

The rear lifters 61b, 62b, and 63b may be disposed to form a predetermined phase angle with the front lifters 61a, 62a, and 63a with respect to the rotation axis O. Here, the "phase angle" refers to a rotation angle of the drum 51 that is defined in terms of a time required for each of the lifters 61a, 62a, 63a, 61b, 62b, and 63c to reach a point on the circumference of the drum 51. Assuming that the drum 51 is rotated clockwise CW in the present embodiment, the rear lifters 61b, 62b, and 63b may reach the same height before the front lifters 61a, 62a, and 63a, and the difference in times taken by the rear lifters 61b, 62b, and 63b and the front lifters 61a, 62a, and 63a to reach the same height may correspond to the phase angle $\Delta\theta$.

Assuming that each of the lifters 61a, 62a, 63a, 61b, 62b, and 63b has a length extending in the front-rear direction and a width in the left-right direction (or in a direction orthogonal to the longitudinal direction), a circumferential distance (C3=$\Delta\theta$r, see FIG. 9) corresponding to the phase angle may be greater than 0 and equal to or smaller than twice the width of each of the front lifters 61a, 62a, and 63a in the circumferential direction.

A no-lifter region SE, in which neither the front lifters nor the rear lifters are formed, may be formed between any one pair of front/rear lifters (for example, 61a and 61b) and another pair of front/rear lifters (for example, 62a and 62b) on the inner circumferential surface of the drum 51. The no-lifter region SE may extend from a front end to a rear end of the drum 51.

Specifically, the no-lifter region SE may pass between two adjacent sets of lifters while extending from the front end to the rear end of the drum 51. In detail, the no-lifter region SE may pass between any two adjacent front lifters (for example, 61a and 62a) among the plurality of front lifters 61a, 62a, and 63a and between two rear lifters 61b and 62b that form the phase angle $\Delta\theta$ with the two adjacent front lifters 61a and 62a, respectively, while extending straight from the front end to the rear end of the drum 51.

Since the no-lifter region SE extends straight from the front end to the rear end of the drum 51, the laundry may be uniformly distributed to front and rear regions of the drum 51 in the no-lifter region SE.

Typically, the washing machine detects eccentricity of the drum 51 before performing a spin-drying process. Then, when the detected eccentricity is within a reference range, the drum 51 is accelerated such that the rotational speed of the drum 51 reaches a predetermined spin-drying speed (or spin-drying RPM), and when the detected eccentricity is not within the reference range, fabric distribution is performed to change the position of fabrics in the drum 51. If the detected eccentricity is not within the reference range, the fabric distribution process is repeated. When the number of repetitions of the fabric distribution process reaches a predetermined number, it is determined that the fabric distribution has failed, and the spin-drying process is not started.

In the laundry treating apparatus according to the present embodiment, a first fabric positioned at the rear side of the drum 51 (that is, a fabric to be lifted up by the rear lifters 61b, 62b, and 63b) and a second fabric positioned at the front side of the drum 51 (that is, a fabric to be lifted up by the front lifters 61a, 62a, and 63a) may be lifted up at different time points (corresponding to a phase difference) due to the phase angle $\Delta\theta$ formed between the front lifters 61a, 62a, and 63a and the rear lifters 61b, 62b, and 63b. Accordingly, the fabric distribution may be more smoothly performed.

More specifically, referring to FIG. 10, when the drum 51 is rotated clockwise CW in a state in which the rear lifters 61b, 62b, and 63b are positioned at a lowest point ($\theta=0$) of the drum 51, the first fabric may be lifted up first by the rear lifters 61b, 62b, and 63b, and after a time corresponding to the phase angle $\Delta\theta$ has passed, the second fabric may be lifted up by the front lifters 61a, 62a, and 63a.

Assuming that the fabrics are rolled ($\theta<\pi/2$) and that a position (P) from which the fabric lifted up by the lifters 61a, 62a, 63a, 61b, 62b, and 63b falls is a position Pd, the first fabric lifted up by the rear lifters 61b, 62b, and 63b may reach the position (or height) Pd and fall first, and after that, the second fabric lifted up by the front lifters 61a, 62a, and 63a may reach the position Pd and fall.

As described above, the first fabric and the second fabric may be moved by the rear lifters 61b, 62b, and 63b and the front lifters 61a, 62a, and 63a, respectively, at different time points without forming lumps, and thus may be evenly distributed. Accordingly, the number of repetitions of the fabric distribution process may be reduced, and the number of cases in which the spin-drying process is not started due to the failure of the fabric distribution may be decreased. In addition, the total washing time including the spin-drying time may also be reduced.

Furthermore, since the fabrics are moved with a phase difference therebetween while being rolled or tumbled, friction or collision between the fabrics may occur relatively more frequently due to the relative movement of the fabrics. Accordingly, contaminants in the fabrics may be removed relatively more effectively by the washing operation (that is, the washing effect may be improved).

While specific exemplary embodiments of the present disclosure are described and illustrated above, it would be obvious to those skilled in the art that various modifications and variations can be made thereto within the spirit and scope of the present disclosure. Accordingly, such modifications or variations are not to be regarded as a departure from the spirit or scope of the present disclosure, and it is intended that the present disclosure cover the modifications and variations of the present disclosure provided they come within the scope of the appended claims and their equivalents.

What is claimed is:

1. A laundry treating apparatus comprising:
    a drum configured to rotate about a rotation axis extending in a front-rear direction of the drum; and
    a lifter that is disposed at an inner circumferential surface of the drum and that is configured to, based on the drum rotating, revolve around the rotation axis,
    wherein the lifter comprises a lifter frame disposed at the inner circumferential surface of the drum and a frame cover that is coupled to the lifter frame and that protrudes radially inward from the inner circumferential surface of the drum,
    wherein the lifter frame comprises (i) a frame base that is coupled to the inner circumferential surface of the drum and that includes a seating groove provided along a circumference of the frame base, (ii) a frame upper plate spaced apart from the frame base in a direction toward a center of the drum, and (iii) a frame sidewall connecting the frame upper plate to the frame base,
    wherein the frame cover comprises a cover upper plate having an inner surface that faces the frame upper plate and a cover sidewall having a lower end and an upper end,
    wherein the lower end of the cover sidewall is mounted on the seating groove to couple to the frame base, and the upper end of the cover sidewall is connected to the cover upper plate, and
    wherein a spacing rib, providing a space between the cover sidewall and the frame sidewall, protrudes from the seating groove.

2. The laundry treating apparatus of claim 1, wherein a protruding surface of the spacing rib has a curved surface.

3. The laundry treating apparatus of claim 2, wherein the seating groove forms a closed curve along the circumference of the frame base, and the spacing rib is disposed at a curved portion of the frame base.

4. The laundry treating apparatus of claim 1, wherein:
    a coupling tab protrudes from a lower end portion of the frame cover,
    a tab binding port, into which the coupling tab is inserted based on the lifter frame being coupled to the frame cover, is defined inside the seating groove of the lifter frame, and
    a tab guide portion is provided at the frame sidewall, protrudes toward the tab binding port, and has a shape that includes an inclined surface.

5. The laundry treating apparatus of claim 4, wherein a stepped portion is defined at a bottom surface of the frame base at a portion in which the tab binding port is defined and has a shape corresponding to the coupling tab.

6. The laundry treating apparatus of claim 1, wherein a supporting rib is disposed at an inner bottom surface of the seating groove and protrudes to a height shorter than a depth of the seating groove such that a lower end portion of the cover sidewall is mounted on the supporting rib.

7. The laundry treating apparatus of claim 1, wherein the lifter frame further comprises a spacer that is disposed at the frame upper plate, that protrudes toward an inner surface of the frame cover, that extends along a first direction, and that provides a space between the inner surface of the frame cover and the frame upper plate.

8. The laundry treating apparatus of claim 7, wherein the spacer is configured to space apart from the inner surface of the cover upper plate.

9. The laundry treating apparatus of claim 7, wherein the spacer is configured to contact the inner surface of the cover upper plate.

10. The laundry treating apparatus of claim 7, wherein a dome protrudes upward from the cover upper plate at a position corresponding to the spacer.

11. The laundry treating apparatus of claim 1, wherein the lifter frame is made of a synthetic resin material, and the frame cover is made of a metal material.

12. The laundry treating apparatus of claim 1, wherein the lifter comprises:
- a plurality of front lifters disposed along a circumferential direction of the drum; and
- a plurality of rear lifters disposed behind the front lifters along the circumferential direction of the drum.

\* \* \* \* \*